United States Patent [19]

Norman et al.

[11] Patent Number: 4,666,721

[45] Date of Patent: May 19, 1987

[54] PROCESS OF REMOVING ACIDS FROM JUICE

[75] Inventors: Seth I. Norman, Midland; Kathleen F. O'Brien, Sterling Heights, both of Mich.

[73] Assignee: The Dow Chemical Company, Midland, Mich.

[21] Appl. No.: 747,535

[22] Filed: Jun. 21, 1985

[51] Int. Cl.$^4$ ............................................... A23L 2/36
[52] U.S. Cl. ................................. 426/271; 426/599; 426/422; 426/330.5; 426/490
[58] Field of Search ................... 426/330.5, 422, 599, 426/490, 271

[56] References Cited

U.S. PATENT DOCUMENTS

| | | | |
|---|---|---|---|
| 4,008,339 | 2/1977 | Matsuda et al. | 426/330.5 |
| 4,439,458 | 3/1984 | Puri | 426/330.5 |
| 4,514,427 | 4/1985 | Mitchell et al. | 426/330.5 |
| 4,522,836 | 6/1985 | Dechow et al. | 426/599 |

*Primary Examiner*—Jeanette Hunter

[57] ABSTRACT

Acids can be removed from fruit juices by treating the juice with a filter apparatus comprising a pre-coat cake containing a functionally effective amount of weak base resin particulates. The sizes of the particulates are such that substantially all of said particulates range from about −50 to about −100 mesh. The weak base resin is most desirably one wherein the amount of strong base functionalities are less than about 5 percent, based on the total number of strong and weak base functionalities. Juices treated using the pre-coat cake taste sweet and the essential character thereof is not altered.

9 Claims, No Drawings

PROCESS OF REMOVING ACIDS FROM JUICE

BACKGROUND OF THE INVENTION

The present invention relates to the removal of acids from fluids, and in particular to the removal of acids from fluids using particulate matter comprising weak base functionalities.

In the processing of fluids, such as fruit juices, it is desirable to remove certain acids from the fluid. For example, it is desirable to remove certain amounts of acids, such as citric acid, malic acid, lactic acid and tartaric acid, which may be present in various juices before and/or during processing. The removal of such acids can be effected using conventional ion exchange technology, and in particular using weak base ion exchange resins. The use of weak base ion exchange resins is desirable due to the fact that such resins do not substantially change the chemical nature of the juice thus introducing an undesirable bad taste to the fluid which is treated.

Unfortunately, conventional weak base ion exchange resins are employed in bead form in relatively large size columns. Such columns require relatively large amounts of weak base resins, making such columns not cost effective. In addition, pre-treatment of resins in columns prior to use, and post-treatment of resins in columns are both time consuming.

In view of the known deficiencies which are apparent in the treatment and processing of fluids such as juices, it is highly desirable to provide a process for removing acids from such fluids which can be performed in a highly effective and efficient manner.

SUMMARY OF THE INVENTION

The present invention is a process for removing acids from fluids, said process comprising treating said fluid with a filter apparatus comprising a pre-coat cake containing a functionally effective amount of weak base resin particulates wherein the particulates are absent of substantial amounts of strong base functionalities.

The process of this invention employs weak base resin particulates wherein substantially all of said particulates form a size distribution within which the sizes thereof range from about $-50$ to about $-100$ mesh. Surprisingly, the particulates which are employed in the process of this invention (i.e., wherein substantially all of the particulates have sizes in the range from about $-50$ to about $-100$ mesh) can exhibit deacidification capacity at least as great or higher than particulates having a size in the range from about $-200$ to about $-400$ mesh. In addition, the particulates which are employed in the process of this invention exhibit deacidification capacity at least as great or higher than standard particulates having a size in the range from about $-20$ to about $-40$ mesh.

Surprisingly, the process of this invention allows the skilled artisan to remove undesirable acids from a wide variety of fluids in an efficient and effective manner. In particular, the process for removing acids from fluids such as juices allows the skilled artisan to provide a sweeter tasting juice without altering the essential character of the juice, without introducing an undesirable odor or taste to the juice, and without substantially changing the color of the juice.

The process of this invention is employed in treating and processing a wide variety of fluids. In particular, fluids such as fruit and vegetable juices are efficiently and effectively treated. Of particular interest are juices such as orange, pear, apple, cranberry, grape, pineapple, grapefruit, tomato, and the like. Other fluids which are of particular interest include sugar cane syrups, beet syrups, high fructose corn syrups, and the like.

DETAILED DESCRIPTION OF THE INVENTION

Filter apparatus useful in the process of this invention are those filter devices which can be equipped with small size mesh screens which can support a filter cake, and in particular as pre-coat cake, of weak base resin. Examples of suitable filter devices include the horizontal and vertical leaf filters such as sparkler filters; vacuum filters; tubular filters; rotary vacuum filters; plate and frame filters; and the like. Examples of suitable filters are described in U.S. Pat. Nos. 3,779,386; 4,267,039; 4,269,707; 4,190,532; and 4,117,142. Typically, such filter devices comprise a screen having mesh sizes which range from about $-30$ mesh to about $-140$ mesh, preferably from about $-50$ mesh to about $-100$ mesh.

Weak base resins of this invention can vary, provided however, that the weak base resins comprise a majority of weak base functionalities as opposed to strong base functionalities. Typically, the resins are polymeric matrices comprising weak base functionalities in the free base form. Preferred resins are the epichlorohydrin based epoxy amine resins comprising weak base functionalities in the free base form. Such types of resins are described in U.S. Pat. Nos. 3,340,208 and 3,132,112; both of which are incorporated herein by reference. Such resins are commercially available as Dowex ® WGR ion exchange resins sold by The Dow Chemical Company. Also useful are the epoxy polyamine resins which are commercially available as Amberlite ® IRA-45, 47, 47.5, 48 and 60 by Rohm & Haas; Ionac ® A-300 by Sybron; Dianion ® A-365 by Mitsubishi; Lewatit ® MIH by Bayer; and Duolite ® A-30B, 340, 377 and 561 by Rohm and Haas. Also useful are those weak base resins which solid particulates are the styrene/divinylbenzene type, the phenolformaldehyde type or the acrylic type. The weak base resins which are employed are those resins which are typically in the free base form and which have as low an amount of strong base functionalities as is possible (i.e., are absent of substantial amounts of strong base functionalities). Desirable weak base resins are those which are provided by reacting polymeric matrices having haloalkylated functionalities with polyaminoalkylene amines such as 1,3-diaminopropane, 3,3'-imino-bispropylamine, 1,4-diaminobutane, 1,6-diaminohexane, 2,4-diamino-2-methylpentane, and the like. Such resins can be described as resins having a high weak base capacity and high resistance to oxidation.

The weak base capacity of resins can range from about 1 to about 2. The amount of strong base functionalities relative to weak base functionalities is typically less than about 20 percent, preferably less than about 10 percent, more preferably less than about 5 percent, most preferably less than about 2 percent, based on the total number of strong and weak base functionalities.

The weak base resin particulates are particulates which are of a size suitable to form a cake in the previously described filter devices. The particulates are preferably of a size such that said particulates can form a pre-coat cake on the previously described screen of the filter devices. Typically, the particulates range in size from about −40 mesh to about −400 mesh, preferably from about −60 mesh to about −120 mesh. The particulates can have a uniform size distribution or a size distribution which is quite broad.

For purposes of this invention, the weak base resin particulates have sizes such that there is provided a size distribution wherein substantially all of said particulates in a range from about −50 to about −100 mesh. By the term "size distribution wherein substantially all of said particulates are in a range from about −50 to about −100 mesh" is meant that a relatively minor amount of the total number of particulates have a size less than −100 mesh or larger than −50 mesh. In particular, substantially all of said particulates include greater than about 80, preferably greater than 90, percent by volume of the resin particulates. For example, a highly preferred weak base resin particulate sample exhibits a size distribution such that about 85 percent by volume of resin particulates is in a size range within about −60 to about −90 mesh. In a highly preferred aspect of this invention, substantially all the employed particulates are of a size range from −50 to about −100 mesh.

The weak base particulates can be provided by a variety of means. For example, weak base resins can be ground to the desired size particulates by shearing a slurry of resin beads in a shearing device such as a high shear blender, by grinding using a mortar and pestle, by centrifugal grinding, by air impingement techniques, by using a ball mill or hammer mill, and the like.

By the term "pre-coat cake" is meant a relatively uniform build-up or layer of particulate resin which forms on the filter screen. Typically, such a pre-coat cake is provided by preparing a slurry of particulates in a liquid (e.g., water) and circulating the slurry through the filter screen. The pre-coat particulates are maintained on the filter screen and circulation of the slurry is continued until the layer of particulate builds up on the filter screen to the desired consistency and thickness.

The pre-coat cake of weak base particulates in the filter apparatus can be provided using a variety of techniques. Examples of suitable techniques are disclosed in U.S. Pat. No. 3,250,703, which is incorporated herein by reference. For example, an aqueous slurry (comprising from about 5 to about 20 weight percent particulate and from about 80 to about 95 weight percent deionized water) can be contacted with the filter apparatus using techniques described in U.S. Pat. No. 3,250,703. The pre-coat cake can be employed in a wet form in providing the process of this invention without further pre-treatment.

A functionally effective amount of weak base resin particulates is employed in forming the cake. The amount of particulate which is employed can depend upon a variety of factors including the weak base capacity of the particulates, the size of the particulates, and the like. Typically, the thickness of the cake ranges from about ⅛ inch to about 1 inch, preferably from about ¼ inch to about ½ inch.

The fluid is treated using the filter apparatus. Typically, the fluid is in liquid form and exhibits a viscosity which is low enough as to not create a large pressure drop during treatment with the filter cake. Preferably, the liquid exhibits a viscosity similar to a fluid which is treated using conventional filtration techniques. Typically, the flow rate of the fluid which is treated through the filter cake ranges from about 0.1 to about 6 gallons per minute per square foot (gpm/sq. ft.), preferably from about 0.1 to about 2 gpm/sq. ft. The pressure drop of the fluid which is treated typically ranges from about 2 to about 20 pounds, and depends upon factors such as the flow rate of the fluid and the viscosity of the fluid at a given temperature. Typically, the fluid is treated at a temperature below about 80° C., preferably from about 25° C. to about 80° C.

The amount of juice which can be treated per amount of resin particulate can vary depending upon factors such as the type of juice which is being treated, the viscosity of the juice, the acidity of the juice, etc. For example, about 300 pounds of a sample of pineapple juice can be treated per pound of resin particulate, which particulate has a size distribution of about −50 to about −100 mesh, as defined hereinbefore.

The resin particulate in the filter device can be regenerated after exhaustion. About 1 to about 5 bed volumes, preferably 2 bed volumes, of water can be employed to rinse the juice from the filter cake prior to regeneration. For example, about 1 to about 5 bed volumes, preferably 2 bed volumes, of an aqueous basic solution is contacted with the resin. For example, about 3 to about 10 percent active ammonium hydroxide can be employed. The resin is then rinsed with relatively pure water in order to provide a regenerated resin which is wetted by an aqueous liquid having a relatively neutral pH.

The process of this invention allows the skilled artisan to remove varying amounts of acids such as organic acids from fluids such as juices. Such fluids are preferably those juices which contain dissolved solids and, more preferably, suspended solids of less than about 25 μm diameter, most preferably, less than about 0.5 μm diameter. The process of this invention is desirable in that the character (i.e., flavor, odor and nutrient content) of the juice which is treated is not substantially altered during treatment. In addition, undesirable impurities such as salts or hydroxide ions are not introduced to the juice during treatment.

If desired, the fluid can be treated with a column or filter apparatus containing a cation exchange resin prior to the treatment using the process of this invention. Such a treatment allows the skilled artisan to also remove nitrogenous materials and certain minerals from the juice.

If desired, the fluid can be also treated with a column or filter apparatus containing a styrene/divinylbenzene type adsorbent using the process of this invention. Such treatment allows the skilled artisan to also remove bitter components such as limonin and naringin from the juice as taught in U.S. Pat. Nos. 4,439,458 and 4,514,427.

The fluid which is obtained using the process of this invention can be employed as is, can be further treated, can be concentrated, or can be blended with unblended fluid.

The process of this invention in employing particulates wherein substantially all of said particulates are in a size range from about −50 to about −100 mesh can provide a surprisingly high deacidification capacity over particulates of a much smaller size. In addition, the particulates having a predominate size distribution in the range from −50 to −100 mesh exhibit numerous other advantages over much smaller size particulates. For example, in the process of this invention dusting problems are minimized, conventional size screens can be employed, a diatomaceous earth pre-cake is not required, in situ regeneration of resin can be accomplished without major resin loss, low amounts of regenerant are required during resin regeneration (while maintaining the ability of the resins to be regenerated to about 80 percent of capacity), and a low pressure drop in the filter apparatus is provided.

The following example is given to further illustrate the invention but not limit the scope. All parts and percentages are by weight unless otherwise indicated.

EXAMPLE

Into a column is placed −20 to −40 mesh weak base resin of an epichlorohydrin based epoxy amine resin sold commercialy as Dowex® WGR resin by The Dow Chemical Company. The resin is treated by exercising the resin using 5 percent active aqueous hydrochloric acid followed by a rinse using deionized water until an essentially neutral rinse is obtained. The resin is further exercised using a 4 percent active aqueous ammonium hydroxide solution followed by a rinse with deionized water. This treatment is repeated two more times. The resin is ground using a ball mill, and the resulting particulates are screened to a −60 to −120 mesh size. The particulates are dried using a vacuum oven until the particulates have a 20 percent moisture content. The particulates have an approximate size distribution as follows: less than 1 voume percent are −0 to −50 mesh, less than 5 volume percent are −50 to −60 mesh, 85 volume percent are −60 to −90 mesh, less than 5 volume percent are −90 to −100 mesh and less than 5 volume percent are −100 to −120 mesh.

Into 100 g deionized water is slurried 10 g of the particulate. The slurry is pumped into a 47 mm inner diameter Gelman pressure leaf filter having a −100 mesh screen. After pumping the slurry through the filter device, a cake of about ⅜ inch develops. The slurry is recirculated through the filter device for 0.2 hours until the aqueous medium becomes clear, thereby indicating the absence of resin particulates. It is most desirable to avoid dehydration or cracking of the cake. Into the filter apparatus is introduoed a clarified pineapple juice stream having a pH of 4.12. The juice exhibits a °Brix of 17°, a citric acid content of 1.383 percent, and a sugar/acid ratio of 12.29. The juice is treated and collected until the pH of the juice effluent becomes as low as 4.25. The juice is no longer introduced to the filter apparatus and the filter apparatus is flushed with water. The system is then contacted with the 4 percent active aqueous ammonium hydroxide solution and backwashed. When the pH of the effluent reaches 10, the stream is reversed and deionized water is introduced to the system in order to reform the filter cake. The system is washed with water until the effluent is neutral, at which point juice is reintroduced for treatment. About 300 pounds of juice per pound of resin particulate are treated before regeneration is required. The treated sample exhibits a °Brix of 17°, a citric acid content which ranges from about 0.085 to about 0.113, and a sugar/acid ratio which ranges from about 150 to about 200.

For comparison purposes, a juice sample is similarly treated using similar resin but having a particle size distribution in the range from −20 to −40 mesh. About 15 pounds of juice per pound of resin particulate are treated before regeneration is required.

For comparison purposes, a juice sample is similarly treated using similar resin but having a particle size distribution in the range from −200 to −400 mesh. Surprisingly, only about 56 pounds of juice per pound of resin particulate are treated before regeneration is required.

What is claimed is:

1. A process for removing acids from acid-containing juice, comprising contacting acid-containing juice with a filter apparatus comprising a pre-coat cake containing an amount of weak base resin particulates effective to deacidify said acid-containing juice, wherein substantially all of the particulates are in a size range of from about −50 to about −100 mesh and wherein the particulates are absent of substantial amounts of strong base functionalities.

2. The process of claim 1 wherein greater than 80 percent by volume of the resin particulates form a size distribution within which the sizes thereof range from −50 to about −100 mesh.

3. The process of claim 1 wherein greater than 90 percent by volume of the resin particulates form a size distribution within which the sizes thereof range from about −50 to about −100 mesh.

4. The process of claim 1 wherein greater than 85 percent by volume of the resin particulates form a size distribution within which the sizes thereof range from about −60 to about −90 mesh.

5. The process of claim 1 wherein said weak base resin is an epichlorohydrin based epoxy amine resin.

6. The process of claim 1 wherein the amount of strong base functionalities relative to weak base functionalities in the resin is less than about 5 percent based on the total number of strong and weak base functionalities in the resin.

7. The process of claim 1 wherein the amount of strong base functionalities relative to weak base functionalities in the resin is less than about 2 percent based on the total number of strong and weak base functionalities in the resin.

8. The process of claim 1 wherein the pre-coat cake has a thickness which ranges from about ⅛ inch to about 1 inch.

9. The process of claim 1 wherein the flow rate of the acid-containing juice through the pre-coat cake ranges from about 0.1 to about 6 gallons per minute per square foot.

* * * * *